(12) United States Patent
Delsuc et al.

(10) Patent No.: US 12,255,884 B2
(45) Date of Patent: Mar. 18, 2025

(54) METHOD, LEDGER AND SYSTEM FOR ESTABLISHING A SECURE CONNECTION FROM A CHIP TO A NETWORK AND CORRESPONDING NETWORK

(71) Applicant: THALES DIS FRANCE SAS, Meudon (FR)

(72) Inventors: Julien Delsuc, Marseilles (FR); Stéphane Schirar, La Bouilladisse (FR)

(73) Assignee: THALES DIS FRANCE SAS, Meudon (FR)

( * ) Notice: Subject to any disclaimer, the term of this patent is extended or adjusted under 35 U.S.C. 154(b) by 303 days.

(21) Appl. No.: 17/789,836

(22) PCT Filed: Dec. 18, 2020

(86) PCT No.: PCT/EP2020/086930
§ 371 (c)(1),
(2) Date: Jun. 29, 2022

(87) PCT Pub. No.: WO2021/136683
PCT Pub. Date: Jul. 8, 2021

(65) Prior Publication Data
US 2023/0033931 A1   Feb. 2, 2023

(30) Foreign Application Priority Data
Dec. 31, 2019   (EP) ..................................... 19306798

(51) Int. Cl.
*H04L 9/40* (2022.01)
*G06Q 20/36* (2012.01)

(52) U.S. Cl.
CPC .......... *H04L 63/083* (2013.01); *G06Q 20/36* (2013.01)

(58) Field of Classification Search
None
See application file for complete search history.

(56) References Cited

U.S. PATENT DOCUMENTS

| 11,281,779 B2 * | 3/2022 | Scriber ................... G06F 21/33 |
| 2016/0337898 A1 * | 11/2016 | Jeong ................ H04W 12/0431 |

(Continued)

FOREIGN PATENT DOCUMENTS

EP   3547734 A1   10/2019

OTHER PUBLICATIONS

International Search Report (PCT/ISA/210) and Written Opinion (PCT/ISA/237) mailed on Mar. 9, 2021, by the European Patent Office as the International Searching Authority for current International Application No. PCT/EP2020/086930—[16 pages].

(Continued)

*Primary Examiner* — Joshua Joo

(57) ABSTRACT

Provided is a method for establishing a secure connection from a chip to a network. The method comprises sending a connection request with a decentralized identifier address, sending a request for getting a decentralized identifier, sending, to the network, the decentralized identifier, sending, to the chip, an authentication request with data, and determining and sending, to the network, authentication data, and authenticating the chip. It further include sending, to the ledger, a request for getting subscription data associated with the decentralized identifier address, verifying, whether the decentralized identifier address is associated with a subscription wallet address or a subscription address in an operator wallet sending, to the network, associated subscription data, verifying whether valid, and establishing, when valid, a connection to the chip.

8 Claims, 5 Drawing Sheets

(56) References Cited

U.S. PATENT DOCUMENTS

2021/0126785 A1* 4/2021 Liu .................. H04L 9/0637
2021/0185041 A1* 6/2021 Yang ................. H04L 63/126
2022/0311612 A1* 9/2022 Feinberg ............ H04L 9/083

OTHER PUBLICATIONS

Abbie Barbir Aetna: "Final draft text for X.1252 : Baseline identity management terms and definitions; TD2504", ITU-T Draft; Study Period 2017-2020; Study Group 17; Series TD2504, International Telecommunication Union, Geneva; CH—vol. 10/17—Sep. 3, 2019 (Sep. 3, 2019), pp. 1-29, XP044277563, Retrieved from the Internet: URL:https://www.itu.int/ifa/t/2017/sg17/do cs/190827/td/ties/plen/T17-SG17-190827-TD-PLEN-2504 !!MSW-E.docx— [retrieved on Sep. 3, 2019] Annex "B".

\* cited by examiner

METHOD, LEDGER AND SYSTEM FOR ESTABLISHING A SECURE CONNECTION FROM A CHIP TO A NETWORK AND CORRESPONDING NETWORK

FIELD OF THE INVENTION

The invention relates generally to a method for establishing a secure connection from a chip to a network.

The chip may be included in a Secure Element (or SE).

Within the present description, an SE is a smart object that includes a chip(s) that protect(s), as a tamper resistant component(s), access to stored data and that is (are) intended to communicate data with an external device(s), like e.g., an SE host device, such as a Personal Computer (or PC), a (mobile) (tele) phone, an Internet-Of-Things (or IoT) device or any other computing device.

The SE chip, as a chip incorporated in an SE host device, includes an embedded SE (or eSE), an embedded Universal Integrated Circuit Card (or eUICC), an embedded Subscriber Identity Module (or eSIM), an integrated Universal Integrated Circuit Card (or iUICC), and a Trusted Execution Environment (or TEE), as a secure area of an (SE host device) processor and a secured runtime environment, within the SE host device.

Furthermore, the invention also pertains to a (distributed) ledger for establishing a secure connection from a chip to a network.

Moreover, the invention also concerns a system for establishing a secure connection from a chip to a network.

Finally, the invention relates to a network for establishing a secure connection to a chip as well.

STATE OF THE ART

U.S. Pat. No. 10,123,202 B1 describes a solution that creates, at a network side, a user account for storing one or more virtual Subscriber Identity Modules (or vSIMs), as a software SIM version. The network receives, from a user of the user account, a selection of network services to be associated with a vSIM. The network initiates a creation of a BlockChain (or BC) that includes a vSIM certificate for the network services. The vSIM certificate includes an International Mobile Subscriber Identity (or IMSI). The network associates the vSIM certificate with the user account. A client device sends, via a Radio Access Network (or RAN), an Application Programming Interface (or API) call that includes a private authentication code and a query for the vSIM certificate.

However, the described solution is complicated for a client device to connect to the network, so as to download a needed vSIM certificate, since the vSIM needs at least to involve notably a network operator.

There is a need to provide an alternative solution that allows easing, for a client device that is already deployed on the field, a connectivity to the network while being secure.

SUMMARY OF THE INVENTION

The invention proposes a solution for satisfying the just herein above specified need by providing a method for establishing a secure connection from a chip to a network.

According to the invention, the method comprises:

a) sending, by the chip, to the network, a network connection request with a decentralized identifier address;

b) sending, by the network, to a ledger, a request for getting a decentralized identifier associated with the decentralized identifier address;

c) sending, by the ledger, to the network, using the received decentralized identifier address, the decentralized identifier including a public key relating to the chip;

d) sending, by the network, to the chip, a network authentication request including or being accompanied with data;

e) determining, by the chip, using the received data and a private key relating to the chip, authentication data, the private key being associated with the public key;

f) sending, by the chip, to the network, the authentication data;

g) authenticating or not, by the network, using the public key and the authentication data, the chip;

h) sending, by the network, to the ledger, only if the chip is authenticated, a request for getting data relating to at least one subscription to at least one wireless service, as subscription data, the subscription data being associated with the decentralized identifier address;

i) verifying, by the ledger, whether the decentralized identifier address is or is not associated with a subscription wallet address or a subscription address in an operator wallet;

j) sending, by the ledger, to the network, only if the decentralized identifier address is associated with a subscription wallet address or a subscription address in an operator wallet, associated subscription data;

k) verifying, by the network, whether the subscription data is or is not valid; and l) establishing, by the network, a connection to the chip, only if the subscription data is valid.

The principle of the invention is firstly to send, from a chip to a network, a connection request along with an address relating to a Decentralized IDentifier (or DID). Then, the network transmits, to a (distributed) ledger, such as e.g., a BC or Ethereum, a request for getting a DID along with a DID address. The ledger gets, based on the DID address, an associated DID. The ledger sends, to the network, the DID that comprises a public key relating to the chip. The network determines data and sends, to the chip, an authentication request along with the data. The chip generates, based on the data and a private key that corresponds to the public key, authentication data and sends, to the network, the authentication data. The network checks whether the authentication data is or not valid by using the public key and the sent data. In the affirmative, the network sends, to the ledger, a request for getting data relating to one or several subscriptions which is associated with the DID address that is sent in or with the request. Then, the ledger checks whether the DID address is or not associated with subscription data. In the affirmative, the ledger sends, to the network, the subscription data that includes a subscription wallet address. Then, the network checks whether the received subscription data is or not valid. In the affirmative, the network sends, to the chip, a connection authorization.

The chip thus identifies and authenticates to the network by using only a DID address and a private key that are both pre-registered, in an associated manner, at the chip, i.e. at a production time when the chip is personalized.

Only the chip knows its private key that allows the chip to authenticate to the network.

Once personalized, the chip does not need any additional information, so as to establish a secure connection with a network by using a private key and a DID address.

Thus, the chip can be personalized without needing to know neither any network operator nor any network nor any user or customer.

The invention solution does not need any additional diversified information with respect to the operator, the network and/or the customer.

Contrary to the aforementioned prior art solution, the invention solution does not need neither to know any network operator nor to load or download credentials, such as an IMSI and an associated authentication key ki, that relates to the concerned subscription at the chip side.

The invention solution uses the ledger and therefore does not need neither any trusted third party nor any central authority.

The invention solution does neither need any Home Location Registry (or HLR) type entity, so that the chip authenticates to the network.

The invention solution thus provides an easy connectivity from a chip to a network while being secure since the network authenticates the chip by using an associated DID address and a chip public key.

The invention solution allows managing securely one or several subscriptions per chip that is already deployed on the field.

According to a further aspect, the invention includes a network for establishing a secure connection to a chip.

According to the invention, the network is configured to:
receive, from the chip, a network connection request with a decentralized identifier address;
send, to a ledger, a request for getting a decentralized identifier associated with the decentralized identifier address;
receive, from the ledger, the decentralized identifier including a public key relating to the chip;
send, to the chip, an authentication request including or being accompanied with data;
receive, from the chip, authentication data;
authenticate or not, using the public key and the authentication data, the chip;
send, to the ledger, only if the chip is authenticated, a request for getting data relating to at least one subscription to at least one wireless service, as subscription data, the subscription data being associated with the decentralized identifier address;
receive, from the ledger, associated subscription data;
verify whether the subscription data is or is not valid; and
establish a connection to the chip, only if the subscription data is valid.

According to still a further aspect, the invention includes a ledger for establishing a secure connection from a chip to a network.

According to the invention, the ledger is configured to:
receive, from the network, a request for getting a decentralized identifier associated with a decentralized identifier address;
send, to the network, using the received decentralized identifier address, the decentralized identifier including a public key relating to the chip;
receive, from the network, a request for getting data relating to at least one subscription to at least one wireless service, as subscription data, the subscription data being associated with the decentralized identifier address;
verify, whether the decentralized identifier address is or is not associated with a subscription wallet address or a subscription address in an operator wallet, subscription data; and
send, to the network, only if the decentralized identifier address is associated with a subscription wallet address or a subscription address in an operator wallet, the subscription data.

According to still a further aspect, the invention includes a system for establishing a secure connection from a chip to a network.

According to the invention, the system includes the chip, the aforementioned network and the aforementioned ledger.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention method for establishing a secure connection from a chip to a network is implemented by an eUICC, as an SE (chip), the network and a distributed ledger. The SE is coupled to a phone, as an hosting device, that is connected to one or several (communication) networks that access to the ledger.

According to another embodiment, instead of cooperating with an SE, the phone (or another computing device), as a stand-alone device, carries out the functions that are carried out by the SE and that are described infra.

Naturally, the herein below described embodiment is only for exemplifying purposes and is not considered to reduce the scope of the invention.

For example, instead of being embedded, the chip may be carried by a smart card, a dongle, such as e.g., a Universal Serial Bus (or USB) type dongle, or any other medium that may have different form factors.

Figure 1:
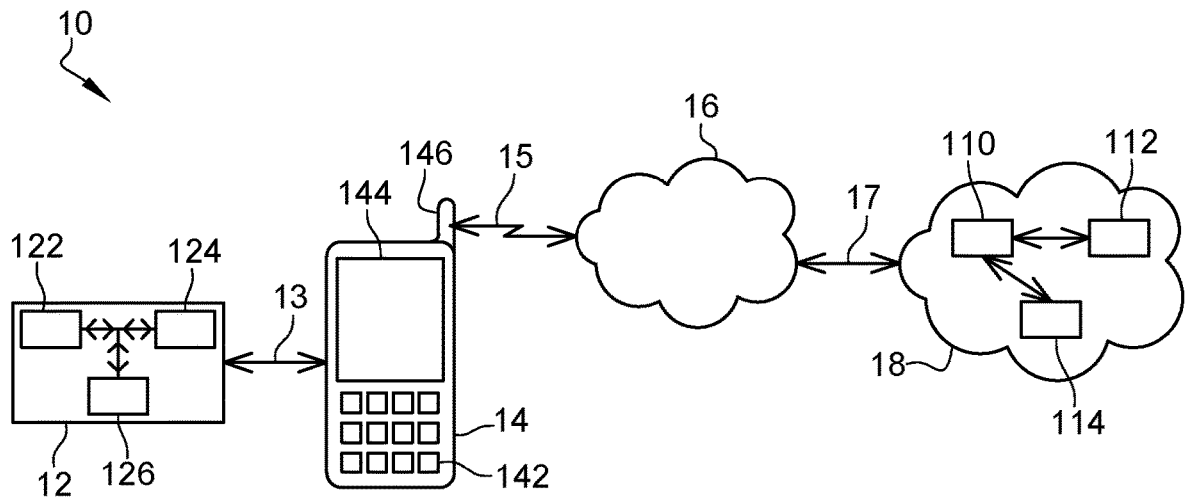
FIG. 1 illustrates a simplified diagram of one embodiment of a system for establishing a secure connection from an eUICC, as an SE (chip), to a network, the system including the SE, the network and a ledger, according to the invention.

FIG. 1 shows schematically a system 10 for establishing a secure connection from an eUICC, as an SE chip, to a mobile radio-communication network.

Such a system 10 includes the SE chip 12, the mobile radio-communication network 16 and a distributed ledger 110, like e.g., a BC or Ethereum.

For a sake of simplicity, the SE chip, the mobile radio-communication network and the distributed ledger are termed hereinafter the SE, the network and the ledger.

For clarity reason, only one SE is represented but a plurality of SEs may be managed by the ledger 110 to establish a secure connection to the network 16.

A user, who owns an SE, desires accessing securely one or several wireless services. securely in the SE 12. The SE 12 compares input data to the stored reference user authentication data and authorize, only when the comparison is successful, a further prosecution, like e.g., a running of an application for establishing a secure connection to a network 16.

The SE processor 122 is preferably able to initiate actions, in order to interact directly with the outside world, in an independent manner of its hosting device, such as e.g., the phone 14. Such a capacity of interaction at the initiative of the SE 12 is also known as a proactive capacity. The SE 12 is thus able to send data, at its own initiative, through its hosting device, to any device, such as e.g., a server, connected to the phone 14.

The SE 12 stores, preferably in a secure manner, in its memory(ies) 124, data for identifying the SE 12, such as e.g., an Integrated Circuit Card IDentifier (or ICCID) or a Unique Universal ID (or UUID), as an SE IDentifier(s) (or ID). The SE ID(s) may be used for identifying the SE (chip).

The SE 12 stores in its memory(ies) 124 an Internet Protocol (or IP) address relating to the SE 12, a Uniform Resource Identifier (or URI) and/or a Uniform Resource Locator (or URL) relating to the SE 12.

Figure 2:
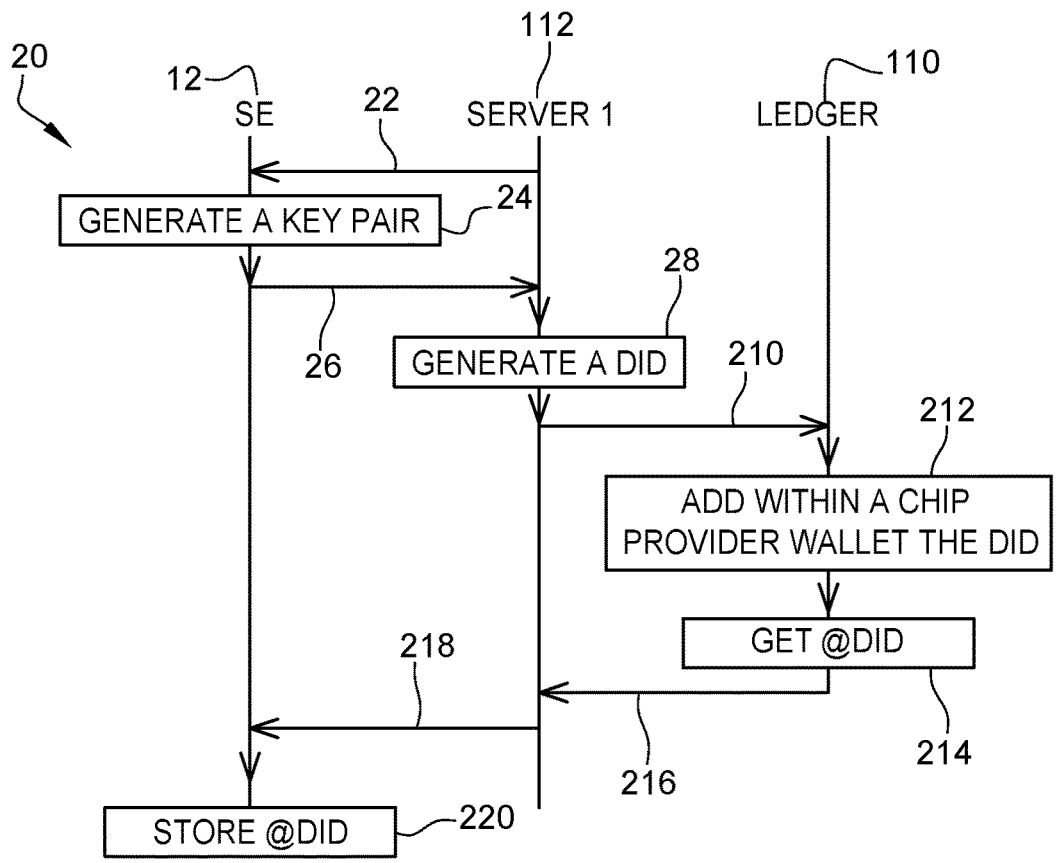
FIG. 2 is one embodiment of a message flow between the SE, a first server and the ledger of FIG. 1, so as to personalize, at a factory production time, the SE with an asymmetric key pair and an associated DID address and to provide, at the ledger, a previously associated created SE provider wallet with the DID, according to the invention.

Once the SE 12 is personalized as described in relation with FIG. 2, the SE 12 is arranged to be deployed on the field or distributed to a client, like e.g., a user, so as to establish, preferably through an SE host device (such as e.g., a phone 14), a secure connection to a network 16.

The SE 12 is connected, in a ContacT (or CT) or ContacT-Less (or CTL) manner, through a bi-directional CT or CTL link 13, to the phone 14, as an SE hosting device.

Within the present description, the adjective "CTL" denotes notably that the communication means communicates via one or several Short Range (or SR) type RF links.

The SR type RF link(s) may be related to any CTL technology that allows the SE 12 to exchange locally data, through a CTL link(s), with a local device(s), such as the phone 14, and/or, possibly via a Network Access Point (or NAP), with a server side.

The SR RF(s) may be related to e.g., a Near Field Communication (or NFC), a Wi-Fi, a ZigBee, a Bluetooth (or BTH), a Bluetooth Low Energy (or) BLE type communication technology (ies) and/or the like.

The SR RF link(s) is (are) used for exchanging, between the SE 12 and the SE hosting device, data at a short range distance. The short range distance is typically from around 20 cm (such as with an NFC type technology) until around 800 m (such as with a BTH type technology).

Instead of a phone 14, the SE hosting device includes a PC, a tablet, a desktop computer, a laptop computer, a media-player, a game console, a tablet, a netbook, a smart jewel (or jewelry), a handset, a Personal Digital Assistance (or PDA), a M2M and/or an IoT device.

The phone 14 includes one or several (micro) processors (and/or a (micro) controller(s)) (not represented), as data processing means, one or several memories, as data storing means, an I/O interface(s) (not represented) and/or possibly means for interfacing with a user, such as a Man Machine Interface (or MMI), that are internally all connected to each other, through an internal bidirectional data bus.

The phone memory(ies) may include one or several volatile memories and one or several non-volatile memories.

The phone memory(ies) may store a first and/or a last name(s) relating to a user, as a user ID(s), an International Mobile Equipment Identity (or IMEI), a Mobile Subscriber Integrated Services Digital Network number (or MSISDN), an Internet Protocol (or IP) address, an email address(es) and/or the like, as a phone 14 ID(s).

Alternately, i.e. instead of the phone 14, or additionally, the SE or a chip, that is connected or communicatively coupled to the phone 14, stores at least a part of the user ID(s) and/or at least a part of the phone ID(s).

The phone memory(ies) store(s) an OS and preferably an invention client application that allows carrying out the operations/functions that are described in relation with FIGS. 3 to 6.

The phone memory(ies) may store one or several embedded applications, like e.g., a Web browser, so as to let interact a phone user with a server(s), like e.g., the first server 112 and/or the second server 114.

The phone MMI may include a display screen(s) 142 and/or a keyboard(s) 144.

Alternately, instead of two separate elements, the phone MMI includes a touch sensitive display screen that integrates a virtual keyboard (not represented).

The phone MMI allows a user (not represented) to interact with the phone 14 and possibly in particular with a client application supported by the phone 14.

The phone I/O interface(s) is preferably connected to an antenna(s) 146 for exchanging, through a bi-directional wireless link 15, data with a network(s) 16.

The phone antenna(s) 146 allow(s) the phone 14 to communicate, preferably through the wireless link 15, with either the network(s) 16 or an entity, such as a ledger 110, a first server 112 or a second server 114, at an Internet, Intranet or cloud 18 side.

The concerned RF may be fixed at several hundreds of MHz, e.g., around 850, 900, 1800, 1900 and/or 2100 MHz, as a Long Range (or LR) type RF(s).

The network(s) 16 may include a mobile radio-communication network(s). Additionally or alternately, the network(s) include(s) a WLAN (acronym for "Wireless Local Area Network"), an Internet and/or Intranet type network(s).

Alternately or additionally, the network(s) 16 include(s) a LoRa and/or a Sigfox type network(s).

Alternately or additionally, the network(s) 16 include(s) slices relating to the 5G, as the fifth generation wireless technology for digital cellular networks, as mobile radio-communication networks, and the following generation(s).

The network(s) may be accessed, from the phone 14, through an SR or LR RF link(s) 15.

Alternatively, i.e. instead of a wireless and/or CTL link(s), or additionally, the phone 14 is connected, through a wire(s) or a cable(s) (not represented), to the network 16.

The network 16 is connected, through a bi-directional link 17, to the Internet, Intranet or cloud 18 that includes a ledger 110, a first server 112 and a second server 114.

The network 16, and more exactly a network device, is notably used for authenticating the SE 12 and checking a validity of one or several subscriptions of the SE 12 to one or several wireless services, and, when applicable, namely when the SE 12 authentication and the subscription validity are both successful, authorizes a connection of the SE 12 to the network 16.

The ledger 110 is able to manage one or several Decentralized IDentifiers (or DID) and one or several wallets, as being data records that belong to respective owners.

The DID describes the associated chip/device and includes the public key relating to the chip/device.

The DID is a self-sovereign digital identity that is independent from any centralized entity, identity provider or certificate authority, while remaining under control of the DID subject, not modifiable and verifiable.

When a wallet, as a data record, is created, a corresponding smart contract, as a piece of code, as executable data, is also created.

Once a wallet is created, the wallet belongs to an owner. Only the owner may update the concerned wallet.

Once the smart contract is updated, the wallet is updated by executing the smart contract.

The execution of the smart contract allows verifying an existence of a wallet.

Smart contracts allow the performance of transactions without any third party. The transactions are trackable and irreversible.

The first server 112 may be identified by an ID(s) relating to the first server 112.

The first server 112 is connected preferably locally at a production time in a factory or the like, over a CT or CTL link (not represented), so as to configure the SE 12.

The first server 112 may be accessible Over-The-Air (or OTA), Over-The-Internet (or OTI) and/or Over The Cloud (or OTC), over the network(s) 16 and 18, from the chip provider.

The first server 112 may be operated by a chip provider or on its behalf.

The first server 112 is identified by a URI1, a URL1, an IP address 1 and/or the like, as a first server 112 ID(s).

The first server 112 is hosted by a computer device that includes a processor(s) (not represented), as data processing means, data storing means and one or several I/O interfaces for exchanging data with outside.

The first server 112 executes or runs an application(s) for configuring one or several SEs 12.

The first server 112 is used for configuring one or several SEs 12, as described in relation with FIG. 2 for the SE 12, during a phase of a creation of an SE provider wallet with a DID, and an association of the SE 12 with an address relating to the DID, as a DID address denoted @DID.

Figure 3:
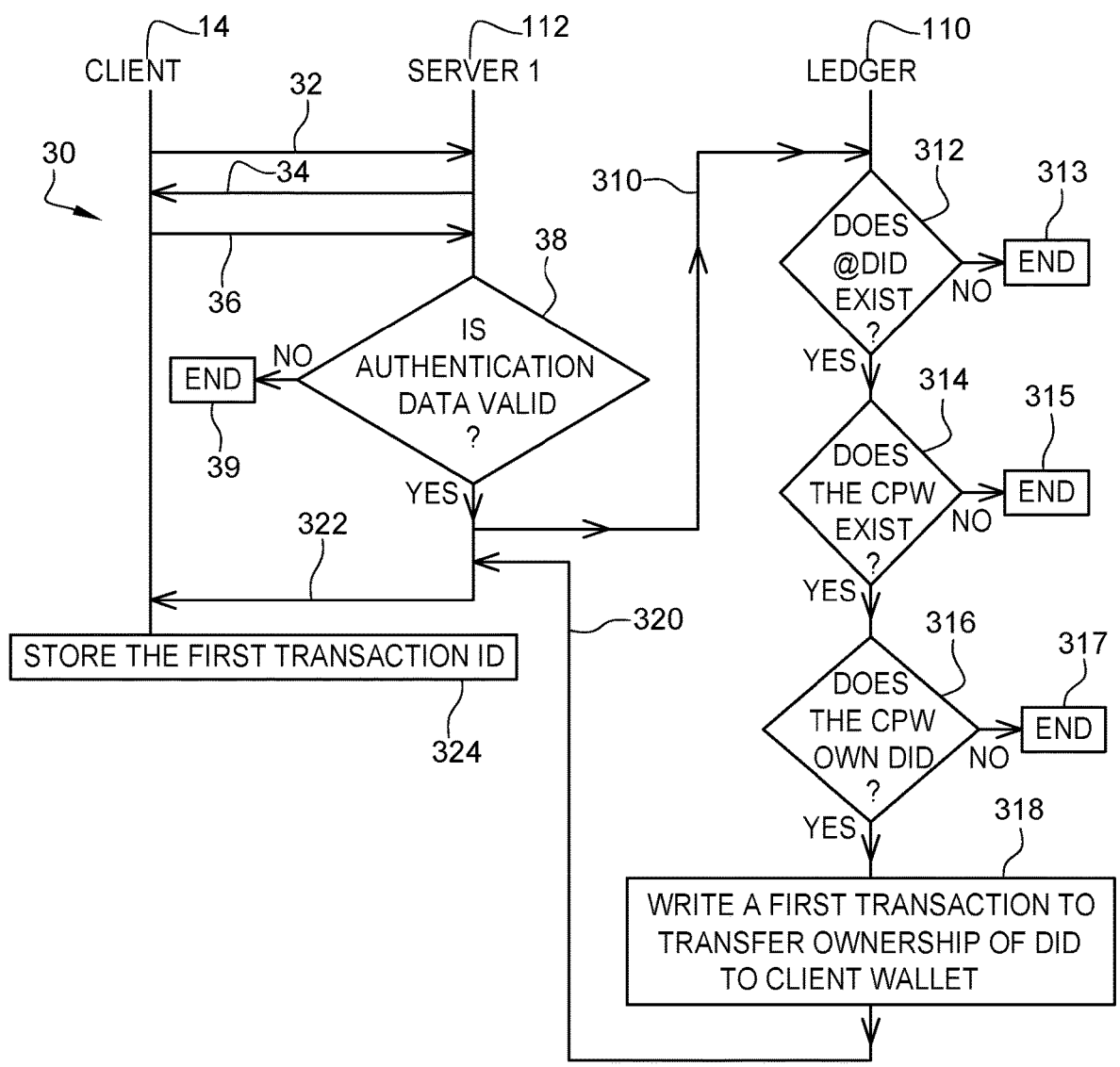
FIG. 3 is one embodiment of a message flow between a client device, the first server and the ledger of FIG. 2, so as to write, at the ledger, a first transaction to transfer ownership of the DID to a previously created client wallet while sending, to the client, a first transaction identifier, according to the invention.

The first server 112 is used for further configuring one or several client devices or clients, as described in relation with FIG. 3 for the phone 14, during a phase of a transfer of the ownership of the DID from the SE (or chip) provider wallet to a client wallet.

The second server 114 is identified by an ID(s) relating to the second server 114.

The second server 114 may be operated by a Mobile Network Operator (or MNO), a Mobile Virtual Network Operator (or MVNO), a service provider or on its behalf.

The second server 114 may be accessible OTA, OTI and/or OTC, over the network(s) 16 and 18, from one or several client devices, such as the phone 14.

The second server 114 is identified by a URI2, a URL2, an IP address 2 and/or the like, as a second server 114 ID(s).

The second server 114 is hosted by a computer device that includes a processor(s) (not represented), as data processing means, data storing means and one or several I/O interfaces for exchanging data with outside.

The second server 114 executes or runs an application(s) for configuring one or several client devices, such as the phone 14, as a subscriber(s) to one or several wireless services.

Figure 4:
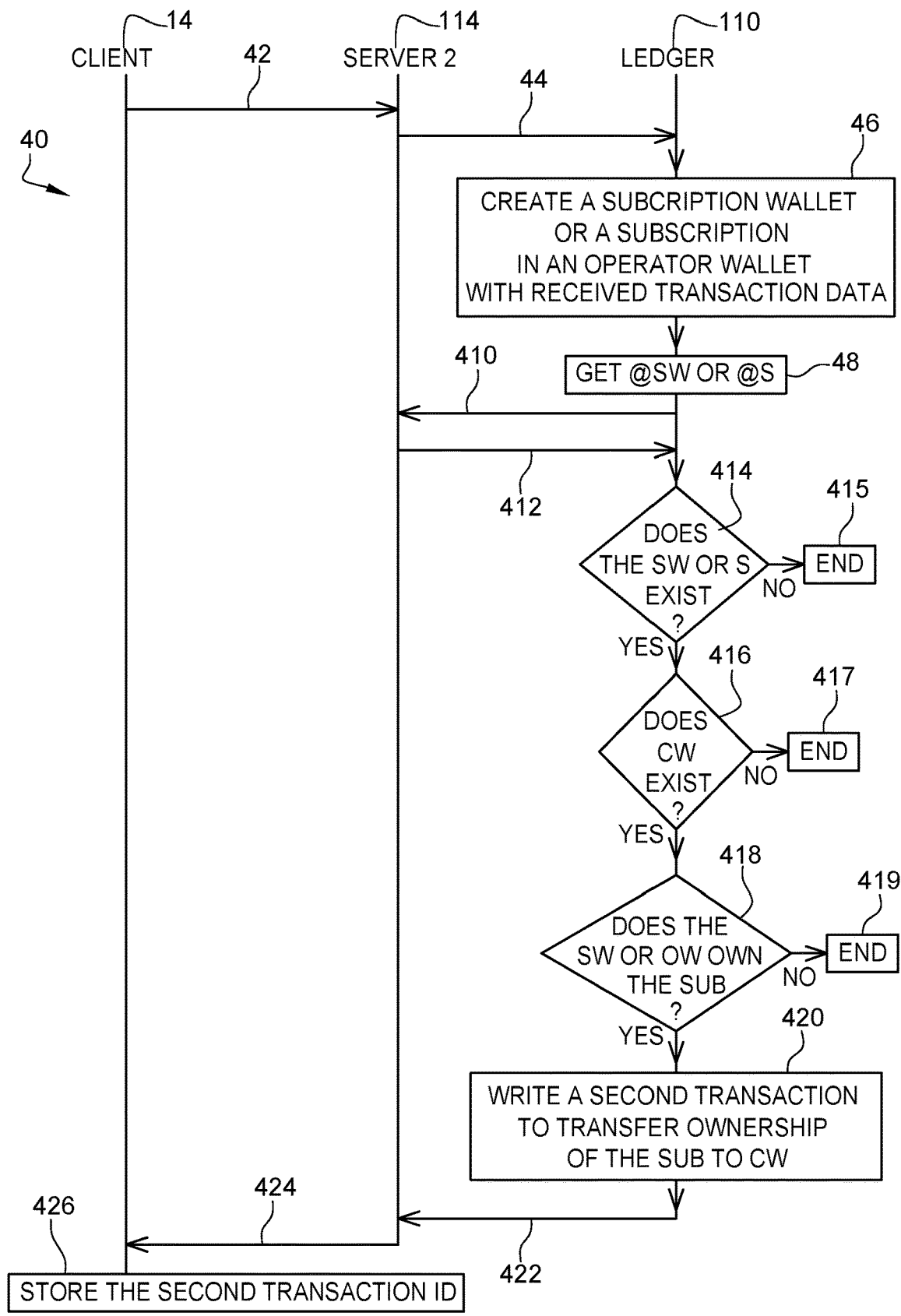
FIG. 4 is one embodiment of a message flow between the owner, a second server and the ledger of FIG. 3, so as to create, at the client initiative, through the second server, at the ledger, a subscription wallet or a subscription in an operator wallet with subscription data, and to write, at the ledger, a second transaction to transfer ownership of the subscription data from the subscription wallet or the subscription to the client wallet while sending, to the client, a second transaction identifier, according to the invention.

The second server 114 is used for configuring one or several client devices as described in relation with FIG. 4 for the phone 14, during a phase of a creation of a subscription wallet or a subscription in an operator wallet with data relating to a subscription(s) to a wireless service(s) and a transfer of the ownership of the subscription data to the client wallet.

Figure 5:
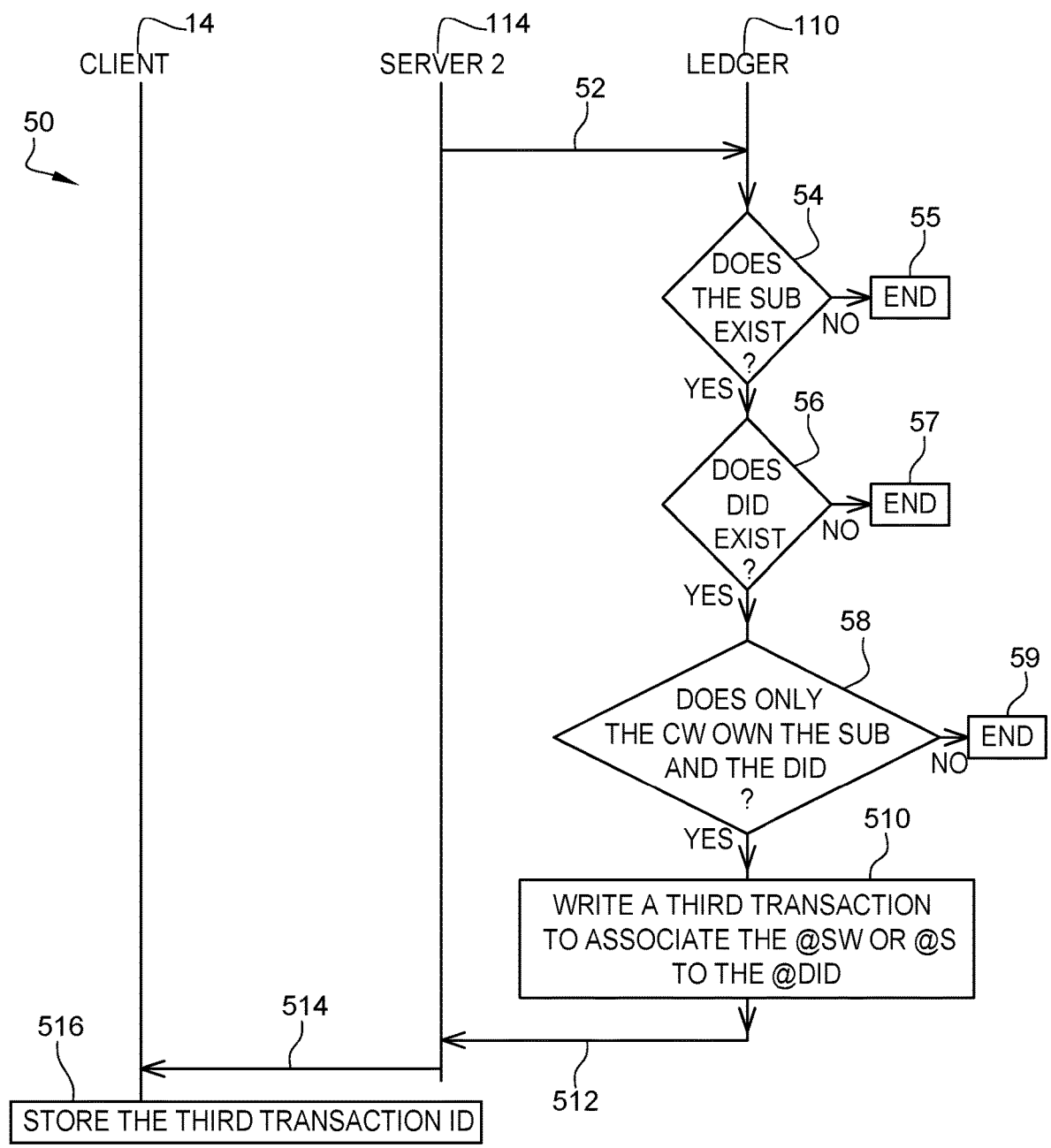
FIG. 5 is one embodiment of a message flow between the client, the second server and the ledger of FIG. 4, so as to write, on the second server request, at the ledger, a third transaction to associate the subscription wallet address or the subscription address and the DID address while sending, to the client, a third transaction identifier, according to the invention.

The second server 114 is further used for configuring one or several client devices as described in relation with FIG. 5 for the phone 14, during a phase of an association of a subscription wallet address or a subscription address to the @DID.

FIG. 2 depicts an exemplary embodiment of a method 20 for configuring an SE 12 with an @DID that involves the SE 12, the first server 112 and the ledger 110.

It is assumed that the SE 12 is present at a production place, like e.g., in a factory.

It is assumed that the first server 112 has created, at the ledger 110, a Chip Provider Wallet (or CPW) (not represented), as a data record that is owned by the SE provider, as the Chip provider.

Firstly, the first server 112 sends, to the SE 12, a request 22 for getting a public key relating to the SE 12. The Pk request 22 includes or is accompanied with an SE ID.

The SE 12 generates 24 an asymmetric key pair, namely a private key pk relating to the SE 12 and an associated public key Pk relating to the SE 12.

The SE 12 stores (not represented) the pK and preferably the associated Pk, as the key pair.

The SE 12 sends, to the first server 112, the Pk 26, as a response to the received Pk request 22.

The first server 112 generates 28 a DID by using the received Pk. The DID preferably includes the Pk.

The first server 112 sends, to the ledger 110, a request 210 for writing the DID within a Chip Provider Wallet (or CPW). The DID writing request 210 includes or is accompanied with the DID.

The ledger 110 adds 212, within the (created) CPW, the received DID.

The ledger 110 gets or retrieves 214 an @DID that is associated with the recorded DID.

The ledger 110 sends, to the first server 112, the associated @DID 216.

The first server 112 sends, to the SE 12, the associated @DID 218.

The SE 12 stores 220 the @DID preferably in association with the pk.

FIG. 3 shows an exemplary embodiment of a method 30 for writing, at the ledger, a first transaction to transfer ownership of the DID from the CPW to a Client Wallet.

It is assumed that the first server 112 has created, at the ledger 110, a Chip Provider Wallet (or CPW) (not represented), as a data record that is owned by the Chip Provider.

Firstly, the phone 14, as a client, sends, to the first server 112, a request 32 for owning the CPW. The CPW owning request 32 includes or is accompanied with the @DID and an ID relating to a Client Wallet (or CW), as CWID.

The phone 14 may use a HyperText Transfer Protocol (Secure) (or HTTP(S)) type channel to address the CPW owning request 32 to the first server 112.

Then, the first server 112 sends, to the phone 14, a request 34 for getting authentication data. The authentication data request 34 may include a challenge or other data that the phone 14 may use to generate authentication data to be submitted to the first server 112.

The phone 14 may generate authentication data, based on data received from the first server 112, such as a seed shared with the first server 112.

The phone 14 may get (or retrieve), possibly from the coupled SE 12, pre-generated authentication data, such as a One-Time-Password (or OTP) or an (electronic) authentication token that the phone 14 or the SE 12 stores at least in a temporary manner.

The phone 14 sends, to the first server 112, authentication data 36.

The first server 112 verifies 38 whether the received authentication data is or is not valid. To verify the authentication data, the first server 112 may use the seed shared with the concerned client, namely the phone 14 (or the SE 12), to generate reference authentication data and compare the received authentication data to the reference authentication data.

If the received authentication data is not valid and the first server does therefore not authenticate the client, namely the received authentication data does not match the reference authentication data, then the first server 112 closes or terminates 39 the launched process and does not request the ledger 110 to transfer the ownership of the DID from the CPW to a CW.

Otherwise, i.e., only if the first server 112 authenticates the client, namely the received authentication data is valid, the first server 112 sends, to the ledger 110, a request 310 for writing a first transaction to transfer the ownership of the DID from the CPW to a CW. The first transaction writing request 310 includes or is accompanied with the @DID and the CWID that the first server 112 has previously received from the phone 14, as client, in or with the CPW owning request 32.

Then, the ledger 110 verifies 312, based on the received @DID, whether the @DID does or does not exist.

If the received @DID does not exist, then the ledger 110 closes or terminates 313 the launched process and does not transfer the ownership of the DID to the CW.

Otherwise, i.e., only if the received @DID exists, the ledger 110 verifies 314, based on the received first transaction writing request 310, whether the CPW does or does not exist.

If the CPW does not exist, then the ledger 110 closes or terminates 315 the launched process and does not transfer the ownership of the DID to the CW.

Otherwise, i.e., only if the CPW exists, the ledger 110 verifies 316 whether the CPW does or does not own the DID.

If the CPW does not own the DID, then the ledger 110 closes or terminates 317 the launched process and does not transfer the ownership of the DID to the CW.

Otherwise, i.e., only if the CPW owns the DID, the ledger 110 writes 318 a first transaction to transfer the ownership of the DID from the CPW to the (created) CW. To write the first transaction, the ledger 110 allocates, to the phone 14, as client, a first transaction ID that is thus registered for the phone 14, as wallet owner of the CW.

Thus, the phone 14, as client, owns the CW.

The ledger 110 sends, to the first server 112, as a response to the first transaction writing request 310, the associated first transaction ID 320.

The first server 112 sends, to the client 14, the associated first transaction ID 322.

The client 14 stores 324, preferably in the SE 12, the first transaction ID preferably in association with the @DID and the pk.

FIG. 4 depicts an exemplary embodiment of a method 40 for creating, at the ledger, an associated Subscription Wallet (or SW) or an associated Subscription (or S) in an operator wallet with subscription data, to associate the SW or the S to the CW and to associate the SW address, as @SW, and the @DID, and to write, at the ledger, a second transaction to transfer the ownership of the subscription data from the SW or the S to the CW while sending, to the client, a corresponding second transaction identifier.

It is assumed that the client 14, or preferably the SE 12 cooperating with the client 14, stores the first transaction ID in association with the @DID and the pk.

Firstly, the phone 14, as client, sends, to the second server 114, a request 42 for creating a SW or a S in an Operator Wallet (or OW). The SW or S creating request 42 includes or is accompanied with the first transaction ID and the @DID.

The phone 14 may use an HTTP(S) type channel to address the SW or S creating request 42 to the second server 114.

Once the second server 114 has received the SW or S creating request 42, the second server 114 sends, to the ledger 110, a request 44 for creating a SW or a S. The SW or S creating request 44 includes or is accompanied with a CWID and data relating to one or several subscriptions.

The data relating to one or several subscriptions includes, for each subscription:
- a number of one or several (identified) devices, such as the phone 14, that are allowed to use the concerned subscription;
- each (identified) cell and/or country where the concerned subscription is allowed to be used;
- a date of expiry until which the concerned subscription is allowed to be used.

The ledger 110 creates 46 a SW or a S while adding the received data relating to one or several subscriptions, as subscription data (or SUB).

Once the ledger 110 has created the SW or the S with the SUB, the ledger 110 retrieves or gets 48 an associated @SW or @S.

The ledger 110 sends, to the second server 114, the @SW or the @S 410.

The second server 114 sends, to the ledger 110, a request 412 for writing a second transaction to transfer the ownership of the SUB from the SW or the OW to the CW. The second transaction writing request 412 includes or is accompanied with the @SW or the @S and the first transaction ID, as a CWID, that the second server 112 has previously received from the phone 14, as client, in or with the SW or S creating request 42.

Then, the ledger 110 verifies 414, based on the received @SW or @S, whether the SW or the S does or does not exist.

If the SW or the S does not exist, then the ledger 110 closes or terminates 415 the launched process and does not transfer the ownership of the SUB from the SW or the OW to the CW.

Otherwise, i.e., only if the SW or the S exists, the ledger 110 verifies 416, based on the received first transaction ID, whether the CW does or does not exist.

If the CW does not exist, then the ledger 110 closes or terminates 417 the launched process and does not transfer the ownership of the SUB from the SW or the OW to the CW.

Otherwise, i.e., only if the CW exists, the ledger 110 verifies 418 whether the SW or the OW does or does not own the SUB.

If the SW or the OW does not own the SUB, then the ledger 110 closes or terminates 419 the launched process and does not transfer the ownership of the SUB from the SW or the OW to the CW.

Otherwise, i.e., only if the SW or the OW owns the SUB, the ledger 110 writes 420 a second transaction to transfer the ownership of the SUB from the SW or the OW to the CW. To write the second transaction, the ledger 110 allocates, to the phone 14, as client, a second transaction ID that is thus registered for the phone 14, as wallet owner of the CW.

Thus, the phone 14, as client, owns the SUB that is recorded or registered in the CW.

The ledger 110 sends, to the second server 114, as a response to the second transaction writing request 412, the associated second transaction ID 422.

The second server 114 sends, to the client 14, the associated second transaction ID 424.

The client 14 stores 426, preferably in the SE 12, the second transaction ID preferably in association with the @DID and the pk.

FIG. 5 shows an exemplary embodiment of a method 50 for writing, on the second server request, at the ledger, a third transaction to associate the @SW or the @S and the @DID while sending, to the client, a third transaction identifier.

It is assumed that the client 14, or preferably the SE 12 cooperating with the client 14, stores the second transaction ID in association with the @DID and the pk.

Firstly, the phone 14, as client, sends, to the second server 114, a request 52 for writing a third transaction to associate the @SW or the @S and the @DID. The third transaction writing request 52 includes or is accompanied with the second transaction ID and the @DID.

Then, the ledger 110 verifies 54, based on the received @SW or @S, whether the SUB does or does not exist.

If the SUB does not exist, then the ledger 110 closes or terminates 55 the launched process and does not write any third transaction to associate the @SW or the @S and the @DID.

Otherwise, i.e., only if the SUB exists, the ledger 110 verifies 56, based on the received @DID, whether the DID does or does not exist.

If the DID does not exist, then the ledger 110 closes or terminates 57 the launched process and does not write any third transaction to associate the @SW or the @S and the @DID.

Otherwise, i.e., only if the DID exists, the ledger 110 verifies 58 whether only the CW does or does not own the SUB and the DID.

If the CW does not own the DID or the CW is not the only one that owns the SUB and the DID, then the ledger 110 closes or terminates 59 the launched process and does not write any third transaction to associate the @SW or the @S and the @DID.

Otherwise, i.e., only if CW owns the SUB and the DID, the ledger 110 writes 510 a third transaction to associate the @SW or the @S to the @DID. To write the third transaction, the ledger 110 allocates, to the phone 14, as client, a third transaction ID that is thus registered for the phone 14, as wallet owner of the CW.

Thus, the phone 14, as client, owns the @SW or the @S that is recorded or registered in the CW.

The ledger 110 sends, to the second server 114, as a response to the third transaction writing request 52, the associated third transaction ID 512.

The second server 114 sends, to the client 14, the associated third transaction ID 514.

The client 14 stores 516, preferably in the SE 12, the third transaction ID preferably in association with the @DID and the pk.

Figure 6:
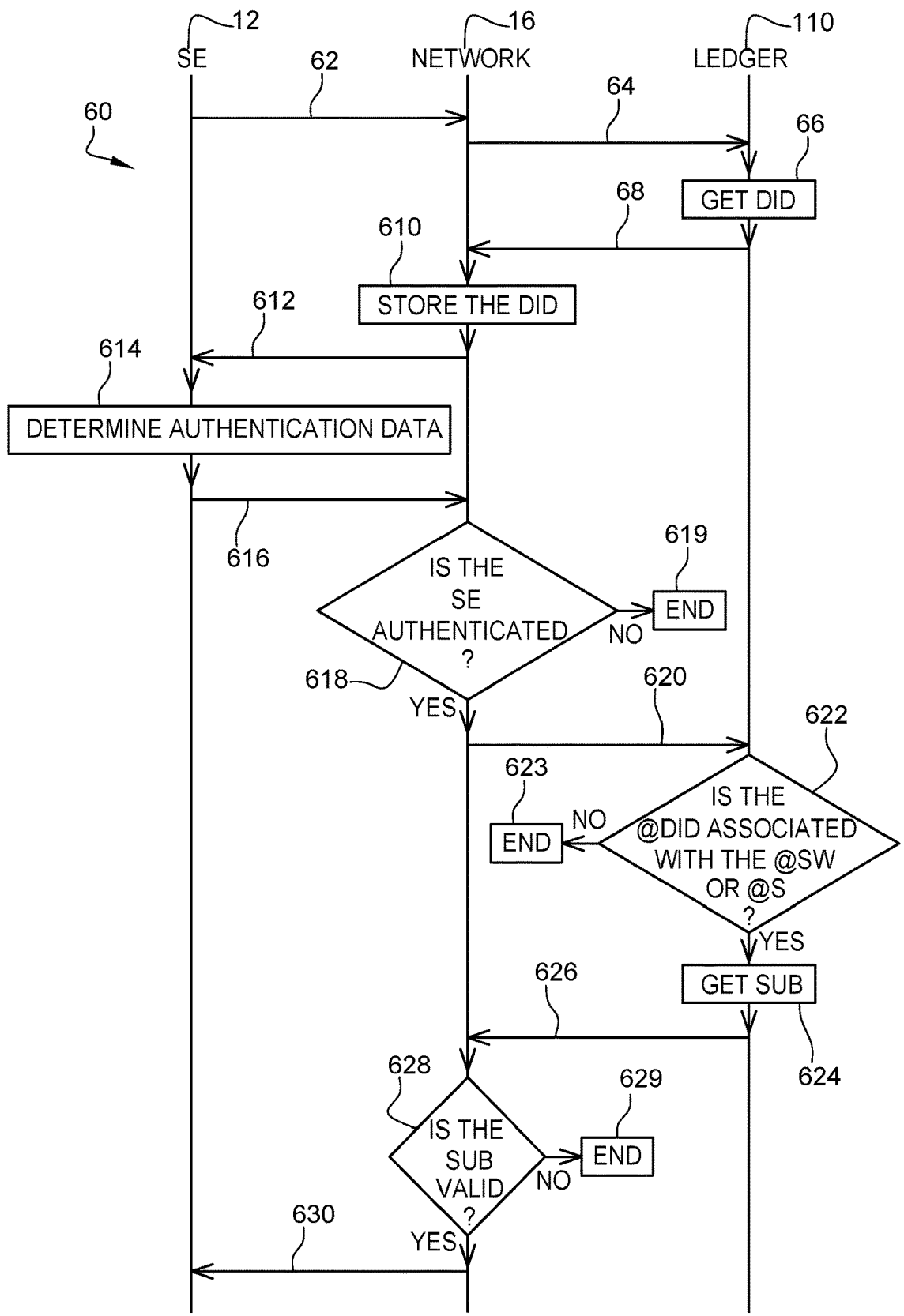
FIG. 6 is one embodiment of one message flow between the SE, the network and the ledger of FIG. 5, so that the network establishes, at an SE initiative, a secure connection to the SE after having involved the ledger, authenticated the SE and validated the subscription, by using the DID address, according to the invention.

FIG. 6 depicts an exemplary embodiment of a method 60 for establishing, at an SE 12 initiative, a secure connection to the network 16 by using the @DID.

Firstly, the SE 12 sends, to the network 16, a request 62 for connecting to the network 16. The network connection request 62 includes or is accompanied with the @DID and connection data. The connection data includes the current date, the location where the SE 12 is currently situated and/or other data relating to the connection context, as context connection data.

The network 16 sends, to the ledger 110, a request 64 for getting the DID that is associated with the @DID. The DID request 64 includes or is accompanied with the @DID.

The ledger 110 retrieves or gets 66, using the received @DID, the DID that includes the SE 12 public key.

The ledger 110 sends, to the network 16, the DID 68, as a response to the DID request 64.

The network 16 stores 610 the received DID.

Then, the network 16 may determine (not represented) data by preferably (but not mandatorily) generating data. Such generated data is valid once, i.e. only for the concerned session, and allows avoiding a replay attack from the client side.

According to a first embodiment, the network 16 generates a RaNDom (or RND), as a challenge and data to be sent.

According to a second embodiment, the network 16 generates an RND and encrypts the RND with the Pk and obtains an encrypted RND, as data to be sent.

The network 16 sends, to the SE 12, a request 612 for authenticating to the network. The network authentication request 612 preferably includes or is accompanied with data. Such data may include e.g., an RND and allows authenticating to the network.

Then, the SE 12 determines 614 authentication data by preferably generating the authentication data by using the received data and the (securely stored) pk.

According to the first embodiment, the SE 12 signs the received challenge, as the received data, by using the pk, as a signature key. The SE 12 thus obtains a signed challenge, as the authentication data to be sent back.

According to the second embodiment, the SE 12 decrypts the encrypted RND, as the received data, by using the pk, as a decryption key. The SE 12 thus obtains the RND (in plain text, i.e. in an unencrypted manner), as the authentication data to be sent back.

The SE 12 sends, to the network 16, the authentication data 616, as a response to the authentication request 612.

Then, the network 16 verifies 618 whether the network 16 does or does not authenticate the SE 12.

According to the first embodiment, to verify the authentication data, the network 16 verifies whether the received authentication data does or does not include an expected signature by using the Pk.

According to the second embodiment, to verify the authentication data, the network 16 verifies whether the received authentication data does or does not match the issued RND.

If the received authentication data is not valid and the network 16 does therefore not authenticate the SE 12, namely, e.g., the received authentication data either does not include the expected signature for the first embodiment or does not match the RND for the second embodiment, then the network 16 closes or terminates 619 the launched process and does not authorize the SE 12 to connect to the network 16.

Otherwise, i.e., only if the received authentication data is valid and the network 16 therefore authenticates the SE 12, namely, e.g., the received authentication data either includes the expected signature for the first embodiment or matches the RND for the second embodiment, the network 16 sends, to the ledger 110, a request 620 for getting data relating to one or several subscriptions, as SUB, associated with the @DID. Such a SUB request 620 includes or is accompanied with the @DID.

Once the ledger 110 has received the SUB request and the @DID, the ledger 110 verifies 622 whether the @DID is or is not associated with the @SW.

According to a preferred embodiment, to verify whether the @DID is or is not associated with the @SW or the @S, the ledger 110 verifies, using the received @DID, whether at least one transaction relating to the @SW or the @S and that is associated with the @DID does or does not exist. If no transaction relating to the @SW or the @S and that is associated with the @DID exists, then the ledger 110 closes or terminates the launched process and does not provide the network 16 with the requested SUB and therefore does not authorize the SE 12 to connect to the network 16. Otherwise, i.e. if the third transaction relating to the @SW or the @S and that is associated with the @DID, as the latest transaction relating to the @SW or the @S and that is associated with the @DID and that is registered on the ledger 110, exists, the ledger 110 retrieves or gets the associated SUB.

If the @DID is not associated with any @SW or any @S, then the ledger 110 closes or terminates 623 the launched process and does not provide the network with the requested SUB and therefore does not authorize the SE 12 to connect to the network 16.

Otherwise, i.e. if the @DID is associated with a @SW or a @S, the ledger 110 retrieves or gets 624 the associated SUB.

Then, the ledger 110 sends, to the network 16, the (retrieved) SUB 626.

Once the network 16 has received the SUB, the network 16 verifies 628 whether the SUB is or is not valid.

To verify whether the SUB is or is not valid, the network 16 may verify the validity of:

- the date to be satisfied, namely whether the expiry date has or has not expired;
- the location to be satisfied, namely whether the location is or is not allowed for the concerned subscription(s);
- (an)other condition(s) to be satisfied, namely whether each other condition is or is not satisfied. The condition(s) to be satisfied is assessed by the network 16 by using e.g., the received data in or with the network connection request 62, namely the date, the location and/or the context connection data.

The SUB verification 628 is based on data received in or with the network connection request 62.

In the negative, i.e. if the SUB is not valid, the second server 114 closes or terminates 629 the launched process and therefore does not authorize the SE 12 to connect to the network 16.

In the affirmative, i.e. if the SUB is valid, the second server 114 establishes 630 a connection to the SE 12 by sending, to the SE 12, a connection approval, as response to the network connection request 62.

The SE 12 and the network 16 are connected.

The invention solution allows getting subscription data, data relating to one or several subscriptions, once the chip/device is on the field and thus represents a dynamic subscription allocation, without needing to know neither the operator, nor the network nor the user, by using a very @DID and a chip/device private key.

The invention solution allows having data relating to several subscriptions per chip/device.

The invention solution allows having several chips/devices that use data relating to one and the same subscription.

The invention solution is thus very flexible.

The invention claimed is:

1. A method for establishing a secure connection from a chip to a network, comprising:
   a) sending, by the chip, to the network, a network connection request with a decentralized identifier address;
   b) sending, by the network, to a ledger, a request for getting a decentralized identifier associated with the decentralized identifier address;
   c) sending, by the ledger, to the network, using the received decentralized identifier address, the decentralized identifier including a public key relating to the chip;
   d) sending, by the network, to the chip, an authentication request including or being accompanied with data;
   e) determining, by the chip, using the received data and a private key relating to the chip, authentication data;
   f) sending, by the chip, to the network, the authentication data;
   g) authenticating or not, by the network, using the public key and the authentication data, the chip;
   h) sending, by the network, to the ledger, only if the chip is authenticated, a request for getting data relating to at least one subscription to at least one wireless service, as subscription data, the subscription data being associated with the decentralized identifier address;
   i) verifying, by the ledger, whether the decentralized identifier address is or is not associated with a subscription wallet address or a subscription address in an operator wallet;
   j) sending, by the ledger, to the network, only if the decentralized identifier address is associated with a subscription wallet address or a subscription address in an operator wallet, associated subscription data;
   k) verifying, by the network, whether the subscription data is or is not valid; and
   l) establishing, by the network, a connection to the chip, only if the subscription data is valid.

2. The method according to claim 1, wherein, to verify whether the received decentralized identifier address is or is not associated with a subscription wallet address or a subscription address in an operator wallet:

the ledger verifies, using the decentralized identifier address, whether at least one transaction relating to the subscription wallet address or a subscription address in an operator wallet and that is associated with the decentralized identifier address does or does not exist.

3. The method according to claim 2, wherein, prior to carry out the step a) of sending, by the chip, to the network, the decentralized identifier address;
a first server sends, to the chip, a request for getting the public key;
the chip generates the private key and the public key;
the chip sends, to the first server, the public key, the first server generates the decentralized identifier by using the received public key;
the first server sends, to the ledger, a request for writing the decentralized identifier within a chip provider wallet;
the ledger writes the decentralized identifier within the chip provider wallet;
the ledger retrieves and sends, through the first server, to the chip, the associated decentralized identifier address; and
the chip stores the associated decentralized identifier address.

4. The method according to claim 3, wherein:
a client sends, to the first server, a request for owning the chip provider wallet with the decentralized identifier address;
the first server sends, to the client, a request for getting authentication data;
the client sends, to the first server, authentication data;
the first server verifies whether the authentication data is or is not valid;
the first server sends, to the ledger, only if the first server authenticates the client, a request for writing a first transaction to transfer the ownership of the decentralized identifier to a client wallet with the decentralized identifier address;
the ledger verifies, based on the received decentralized identifier address, whether the decentralized identifier address does or does not exist and whether the chip provider wallet does or does not exist and, only if the decentralized identifier address and the chip provider wallet exist, verifies whether the chip provider wallet does or does not own the corresponding decentralized identifier;
the ledger writes, only if the chip provider wallet owns the decentralized identifier, a first transaction to transfer the ownership of the decentralized identifier to the client wallet by allocating to the client a corresponding first transaction identifier;
the ledger sends, through the first server, to the client, the first transaction identifier; and
the client stores the first transaction identifier.

5. The method according to claim 4, wherein:
a second server receives, from the client, a request for getting a subscription wallet address or a subscription address in an operator wallet with the first transaction identifier and the decentralized identifier address;
the second server sends, to the ledger, a request for creating a subscription within an operator wallet with the subscription data;
the ledger creates, based on the received request, a subscription within the operator wallet by using the received subscription data and retrieves an associated subscription wallet address or an associated subscription address in an operator wallet; and the ledger sends, to the second server, the subscription wallet address or the subscription address.

6. The method according to claim 5, wherein:
the ledger receives, from the second server, a request for writing a second transaction to transfer the ownership of the subscription data to the client wallet with the subscription wallet address or the subscription address and the client wallet address;
the ledger verifies, based on the received subscription wallet address or the subscription address and the received client wallet address, whether the subscription wallet or the subscription and the client wallet do or do not exist and, only if the subscription wallet or the subscription and the client wallet exist, verifies whether the subscription wallet or the operator wallet does or does not own the subscription;
the ledger writes, only if the subscription wallet or the subscription and the client wallet exist and the subscription wallet or the operator wallet owns the subscription, a second transaction to transfer the ownership of the subscription data to the client wallet by allocating to the client a corresponding second transaction identifier; and
the ledger sends, through the second server, to the client, the second transaction identifier.

7. The method according to claim 6, wherein:
the second server sends, to the ledger, a request for writing a third transaction to associate the subscription wallet address or the subscription address in an operator wallet to the decentralized identifier address with the subscription wallet address or the subscription address in an operator wallet and the decentralized identifier address;
the ledger verifies, based on the received subscription wallet address or the subscription address in an operator wallet and the received decentralized identifier address, whether the subscription and the decentralized identifier do or do not exist and, only if the subscription and the decentralized identifier exist, verifies whether one and the same client wallet does or does not own the subscription and the decentralized identifier;
the ledger writes, based on the received request, only if the subscription and the decentralized identifier exist and one and the same client wallet owns the subscription and the decentralized identifier, a third transaction to associate the subscription wallet address or the subscription address in an operator wallet to the decentralized identifier address by allocating to the client a corresponding third transaction identifier; and
the ledger sends, through the second server, to the client, the third transaction identifier.

8. A system for establishing a secure connection from a chip to a network, the system including the chip, the network, and a ledger, wherein:
a) the chip sends to the network, a network connection request with a decentralized identifier address;
b) the network sends to the ledger, a request for getting a decentralized identifier associated with the decentralized identifier address;
c) the ledger sends to the network, using the received decentralized identifier address, the decentralized identifier including a public key relating to the chip;
d) the network sends to the chip, an authentication request including or being accompanied with data;
e) the chip determines, using the received data and a private key relating to the chip, authentication data;
f) the chip sends to the network, the authentication data;

g) the network authenticates or not, using the public key and the authentication data, the chip;

h) the network sends, to the ledger, only if the chip is authenticated, a request for getting data relating to at least one subscription to at least one wireless service, as subscription data, the subscription data being associated with the decentralized identifier address;

i) the ledger verifies whether the decentralized identifier address is or is not associated with a subscription wallet address or a subscription address in an operator wallet;

j) the ledger sends to the network, only if the decentralized identifier address is associated with a subscription wallet address or a subscription address in an operator wallet, associated subscription data;

k) the network verifies whether the subscription data is or is not valid; and l) The network establishes a connection to the chip, only if the subscription data is valid.

\* \* \* \* \*